United States Patent [19]

Amico et al.

[11] 4,257,153

[45] * Mar. 24, 1981

[54] DEVICE FOR ASSEMBLING AN EXPANSION SHELL

[76] Inventors: Peter J. Amico, 8275 SW. 86th Ter., Miami, Fla. 33143; Raymond F. Amico, 98 Sargent La., Liverpool, N.Y. 13088

[*] Notice: The portion of the term of this patent subsequent to Dec. 18, 1996, has been disclaimed.

[21] Appl. No.: 32,144

[22] Filed: Apr. 23, 1979

[51] Int. Cl.³ .............................................. B23P 11/02
[52] U.S. Cl. ........................................ 29/430; 29/467; 29/509; 29/784; 29/818
[58] Field of Search ................. 29/235, 450, 509, 430, 29/796, 797, 715, 784, 799, 818, 464, 467

[56] References Cited

U.S. PATENT DOCUMENTS

| | | | |
|---|---|---|---|
| 3,568,292 | 3/1971 | Kasper | 29/235 X |
| 3,842,476 | 10/1974 | Prince | 29/715 |
| 4,178,672 | 12/1979 | Amico et al. | 29/430 |

*Primary Examiner*—Kenneth J. Ramsey
*Attorney, Agent, or Firm*—Bruns & Jenney

[57] ABSTRACT

Method and apparatus for automatically assembling and banding together the component parts of an expansion shell of the type typically used in a mine bolt assembly. The parts are loaded into a die position in a first work station wherein a tapered wedge is supported within a central hole passing through the die and two shell sections are seated on inclined sides located on opposite sides of the hole. A thin metal U-shaped strap is placed between die mounted guides so that the legs of the strap are positioned between raised ears carried by the shell segments and the base of the strap passes over the wedge. The die is advanced into a second work station where the ears are coined against the strap. The die is then returned to the first station where an ejection tool is passed upwardly through the hole in the die to force the wedge, and thus the other components, upwardly through a forming gauge and a banding block wherein the parts are conformed into a compact final configuration and bound together by means of a resilient band.

11 Claims, 7 Drawing Figures

4,257,153

DEVICE FOR ASSEMBLING AN EXPANSION SHELL

BACKGROUND OF THE INVENTION

This invention relates to means for automatically assembling and banding together the component parts of an expansion shell so that the assembly can be easily and conveniently handled, packaged and shipped.

Expansion shells, as typically used in conjunction with mine bolts, generally include a centrally-located tapered wedge, that is capable of being threaded upon a bolt, and two shell segments positioned on opposite sides of the wedge. The shell halves are joined together by means of a U-shaped metal strap. The legs of the strap are secured to the shell halves and the base of the strap passes over the top of the wedge. In operation, the shell is inserted into a hole and the bolt is threaded through the wedge to bring the end of the bolt into contact with the base of the strap. Further turning of the bolt will cause the tapered portion of the wedge to be drawn downwardly against the shell halves thereby expanding the shell halves outwardly into locking engagement with the wall of the receiving hole. An expansion shell of the type herein described is more fully disclosed in U.S. Pat. No. No. 3,248,998. Conventionally, each expansion shell is usually manufactured and shipped as an individual unit and the unit later assembled with the companion bolt. Because of its expandable construction, the shell represents an extremely loose assembly that is difficult to hold together, handle and/or package. To overcome this difficulty, resilient bands are generally placed over the two shell segments to hold the segments tightly against the wedge in a desired configuration for inserting the shell into the receiving hole.

Initially, the assembling and banding together of the expansion shell parts involved a great deal of hand labor with each of the individual operations generally being performed at a different location. As a consequence, a relatively long period of time is needed to prepare each expansion shell unit for shipment and the cost of the labor involved in producing each unit is relatively high. An automatic machine was devised by the present Applicants to eliminate much of the hand labor and time required to assemble and band together expansion shells. This machine is the subject matter of a co-pending application Ser. No. 906,823 which was filed May 17, 1978 now U.S. Pat. No. 4,178,672. The present invention incorporates some of the teachings of this prior application in a relatively simple device for assembling and banding together the component parts of an expansion shell.

SUMMARY OF THE INVENTION

It is therefore an object of the present invention to improve means for assembling and banding together the component parts of an expansion shell.

Another object of the present invention is to simplify methods presently used for assembling and banding together expansion shells.

Yet another object of the present invention is to provide a simple machine capable of joining together and forming the component parts of an expansion shell into a tight compact configuration.

A further object of the present invention is to more rapidly and efficiently assemble and band together the component parts of an expansion shell.

A still further object of the present invention is to reduce the costs involved in fabricating expansion shells.

These and other objects of the present invention are attained by means of an automatic device for assembling and banding together the component parts of an expansion shell which includes a die capable of being moved back and forth between two individual work stations. The component parts of the expansion shell are loaded into the die in a prescribed order and alignment at a first work station and the die is then advanced into a second work station wherein a U-shaped strap is staked to two shell halves with the base of the strap being arranged to pass over a centrally located wedge nested in the die. The die is then returned to the initial loading station wherein the wedge is pushed upwardly to drive the shell components through a forming gauge and a banding block, whereupon the parts are forced into a compact unit and banded together in this configuration.

BRIEF DESCRIPTION OF THE DRAWINGS

For a better understanding of the present invention as well as further features thereof, reference is had to the following detailed description of the invention which is to be read in conjunction with the drawings, wherein.

DESCRIPTION OF THE INVENTION

Figure 1:
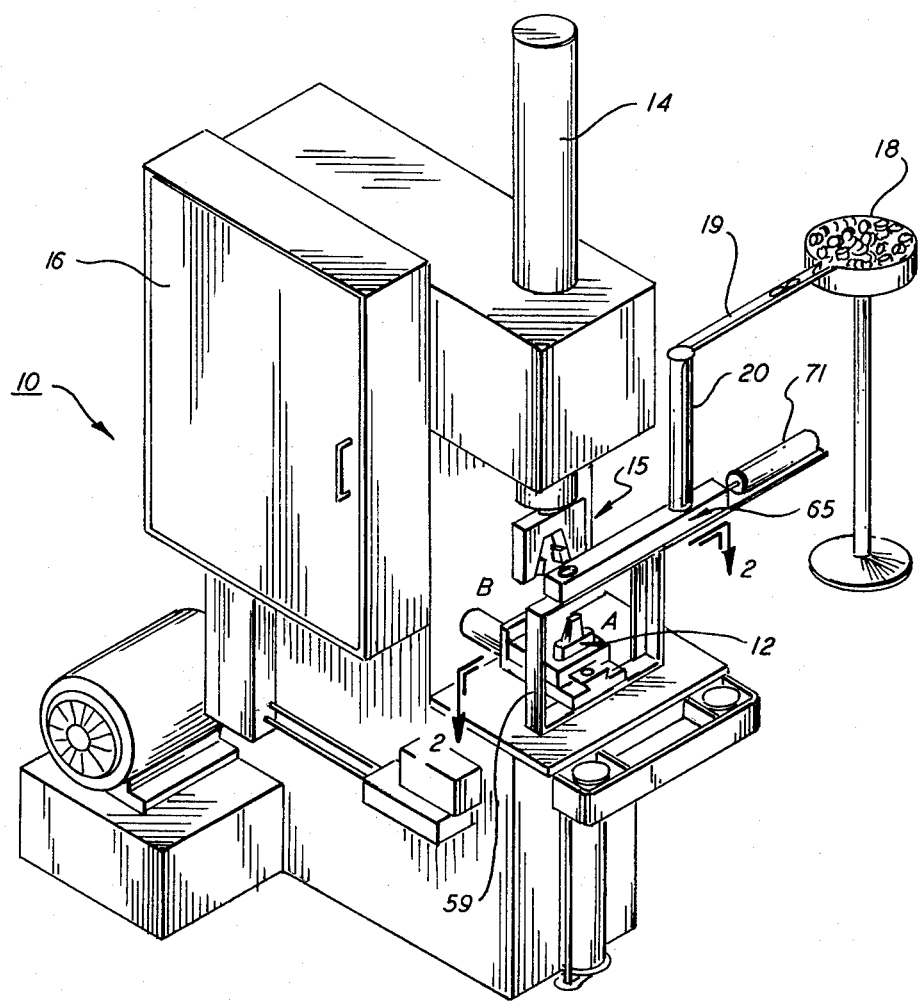
FIG. 1 is a perspective view of an automatic machine having two work stations which incorporates the teachings of the present invention and further showing resilient bands being fed into a first work station from a vibratory bowl.
Figure 2:
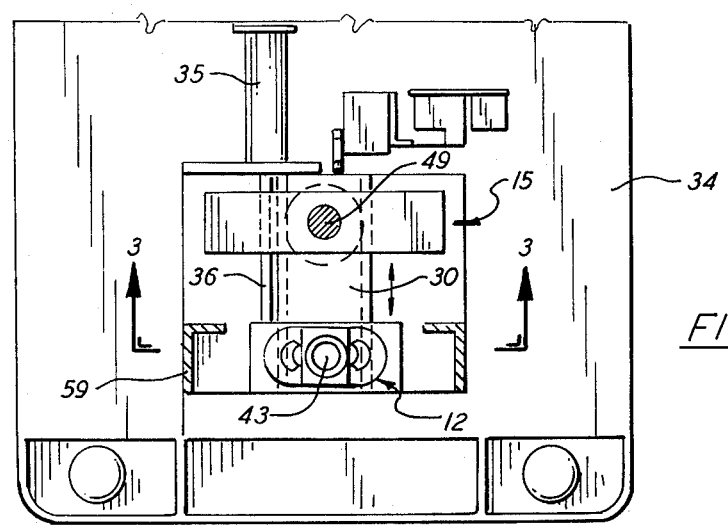
FIG. 2 is an enlarged view taken along lines 2—2 in FIG. 1 showing a top view of the two work stations utilized in the present machine.

Referring initially to FIG. 1 there is shown an automatic machine, generally referenced 10, which embodies the teachings of the present invention. The machine includes a reciprocating slide assembly 11 utilized to move a die 12 between two work stations indicated at locations A and B. The machine contains a hydraulically actuated ram 14 that is arranged to drive a staking tool horizontally into and out of the second work station B. A controlled panel 16 is located upon the side of the machine and houses electrical and hydraulic components used to control the various machine operations. A vibratory bowl 18, of any suitable construction, is situated to one side of the machine and is arranged to move a continual supply of resilient bands in series down a horizontal ramp 19 into the upper opening of a vertical supply tube 20. The operation of the bowl and ramp are described in greater detail in the previously noted patent application filed in the name of the present inventors and this part of the disclosure is hereby incorporated by reference into the present application.

Figure 7:
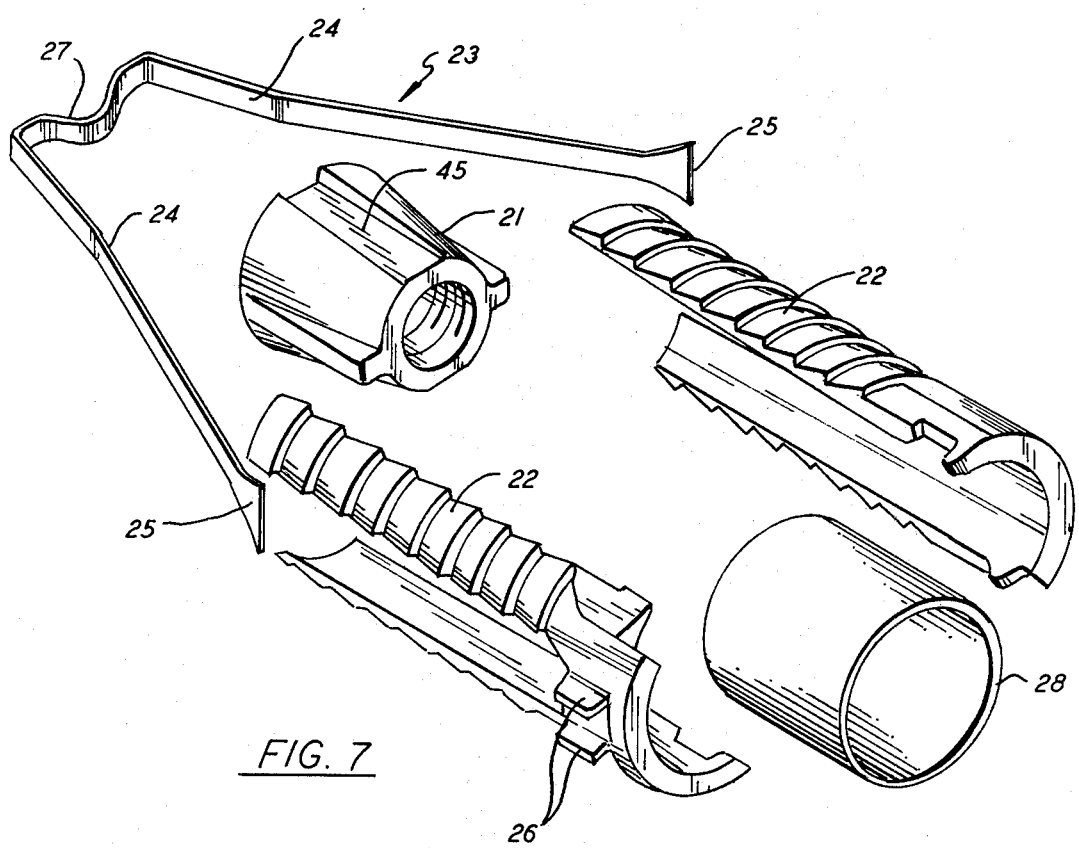
FIG. 7 is an exploded perspective view showing the component parts of an expansion shell prior to being processed in the present machine.
Figure 5:
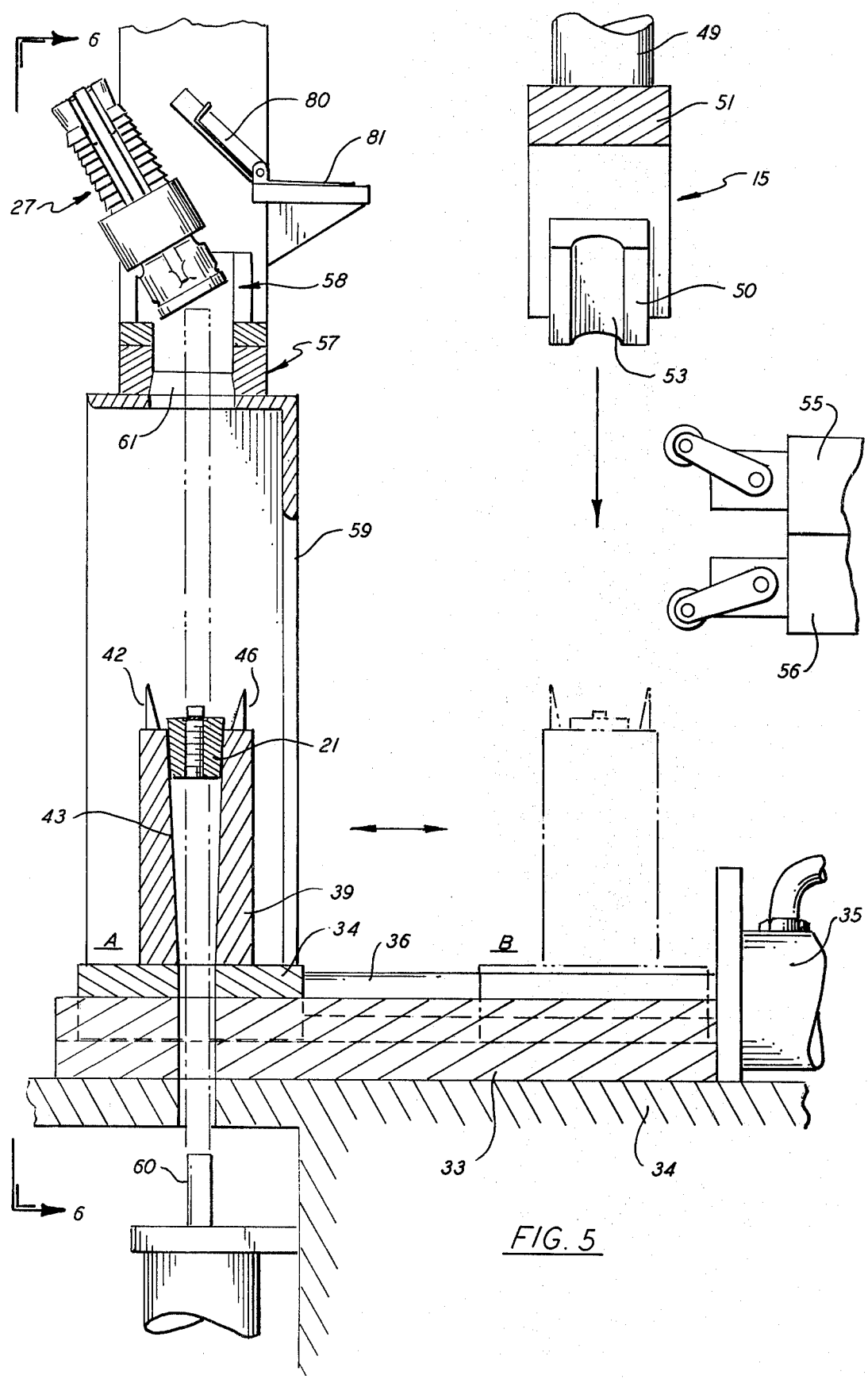
FIG. 5 is also an enlarged side elevation in section further illustrating the two work stations utilized in the present machine.

The component parts of the expansion shell that is assembled in the present machine are shown in exploded detail in FIG. 7. These parts include a centrally located wedge 21 having a tapered body section, a pair of shell halves or sections 22—22 of similar construction, a relatively thin u-shaped metal strap 28, and a cylindrical band 24 preferably formed of a resilient drum. In assembly, the dovetailed ends of the strap legs 25 are inserted between raised ears 26—26 depending upwardly from the outer walls of each shell section and the ears are then coined over the strap to securely affix the two ends of the strap to the shell segments. The wedge is then placed between the shell sections with the larger end thereof positioned adjacent to the base leg of the strap. The shell sections are brought down around the wedge to form a generally cylindrical unit in which the wedge is enclosed within the sections adjacent to the base of the strap. Finally, the component parts making up the unit are secured in the final configuration by passing the resilient band over the assembly to create a tight compact unit 27 as illustrated in FIG. 5.

Figure 3:
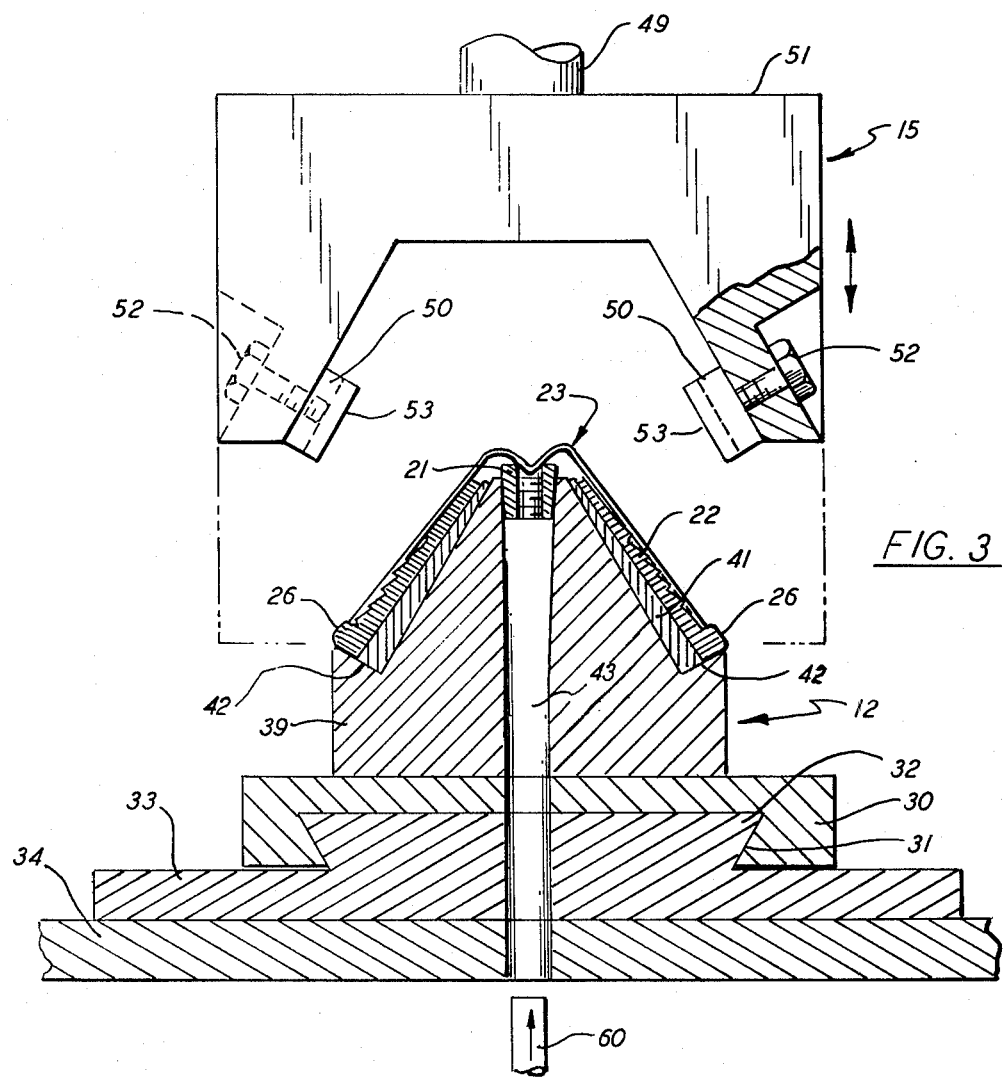
FIG. 3 is a further enlarged section taken along lines 3—3 in FIG. 2 showing a die used to support the component parts of an expansion shell within the machine.
Figure 4:
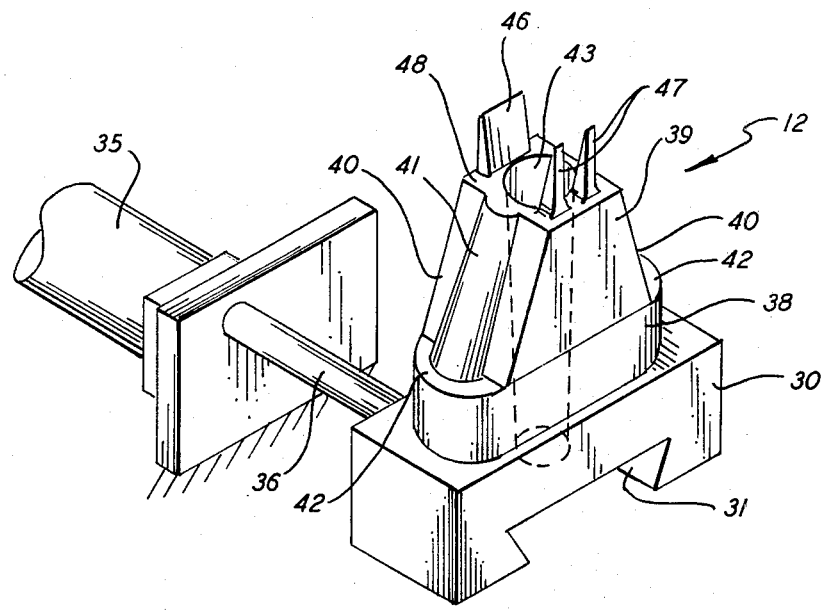
FIG. 4 is a perspective view of the die structure further showing means for moving the die between the two work stations.

Turning now to FIGS. 3 and 4, the die 12 is mounted upon a movable pedestal 30 having a female dovetail 31 formed therein which is adapted to mate with a complimentary male dovetail 32 contained within a slide 33 affixed to the work table 34 of the machine. The pedestal is operatively connnected to a hydraulically actuated drive cylinder 35 via arm 36. The arm is arranged to reciprocally move the pedestal, and thus the die, between the two work stations. Although not shown, the slide is provided with stops against which the die is located in each work station.

The die includes a base member 38 secured to the pedestal and a rigid triangular-shaped support section 39 which rises vertically from the base. The two inclined walls 40—40 of the support section are provided with contoured saddles 41—41 which are adapted to securely seat the shell halves in opposed relationship thereupon. Inclined platforms 42—42, as shown in FIG. 3, provide a rest for the base of each shell section. A vertically-aligned centrally located hole 43 passes through both the die member and the pedestal. The upper opening of the hole is shaped or contoured to slidably receive and properly locate the tapered wedge so that the recessed slots 45 (FIG. 7) are turned towards the two shell sections seated upon the saddles. A pair of strap guides, which includes a rear guide 46 and two co-acting front guides 47—47, depend upwardly from the top surface 48 of the support section 39 and is used to guide the base of the strap into position as it is placed into the die.

Initially, the die is situated in the first work station A and the shell components are seated upon the saddles. With the shell segments positioned upon the saddle, the wedge is nested within the contoured opening with the large end thereof facing outwardly. The base of the metal strap is placed between the guides and positioned adjacent to the large end of the wedge. The two dovetails, located at the end of the legs 25, are now each snapped into the opening provided between the raised ears 26 of each shell section.

With the parts thus loaded in the die, it is transported via the cylinder-driven slide into second work station B by retracting the arm 36 into the cylinder. Once positioned into the cylinder in the second station, the ram is actuated whereupon the staking tool 15 is brought downwardly into coining contact against the raised ears of the shell sections. The staking tool is secured to retractable arm 49 (FIG. 3) of the ram and contains a pair of punches 50—50 that are secured to the inner surface of a support shoe 51 by means of bolts 52—52. The contoured working surfaces 53—53 of each punch is generally arcuate in form and the surface is inclined in reference to the vertical plane of the work table at about the same angle as that of the two inclined side walls 40 of the die member. As a result of this construction, the punches move downwardly with a sliding action into operative contact against the raised ears of the shell segments to deform the ears incrementally to create a strong bond between the shell sections and the strap. Moving the tool incrementally into the work extends the life of the tool and requires less energy to coin the ears than a more conventional punch.

As seen in FIG. 5, extending the staking tool into the second work station causes the tool to physically close contacts contained within a pair of switches 55 and 56. A control signal is generated which prevents the slide from being returned to the first work station before the tool has cleared the second station. This is achieved by preventing the actuating of slide 35 until such time as the tool has been raised to a predetermined elevation.

Upon being restored to the first work station, the partially assembled shell unit is ejected from the die and passed upwardly through a forming gauge 57 and a banding block 58 supported above the first work station by means of a frame 59. The shell components are ejected from the die by passing a rod 60 upwardly through the central opening 43 formed within the die and the slide assembly. The moving rod engages the tapered wedge seated within the hole and carries it upwardly towards the opening 61 contained in the forming gauge. The wedge, in turn, engages the base of the strap and carries it along with the cojoined shell sections upwardly into the forming gauge. Continued extension of the rod passes the components through the opening 61 whereupon the shell halves are forced inwardly into contact against the wedge to create a tight compact unit.

Figure 6:
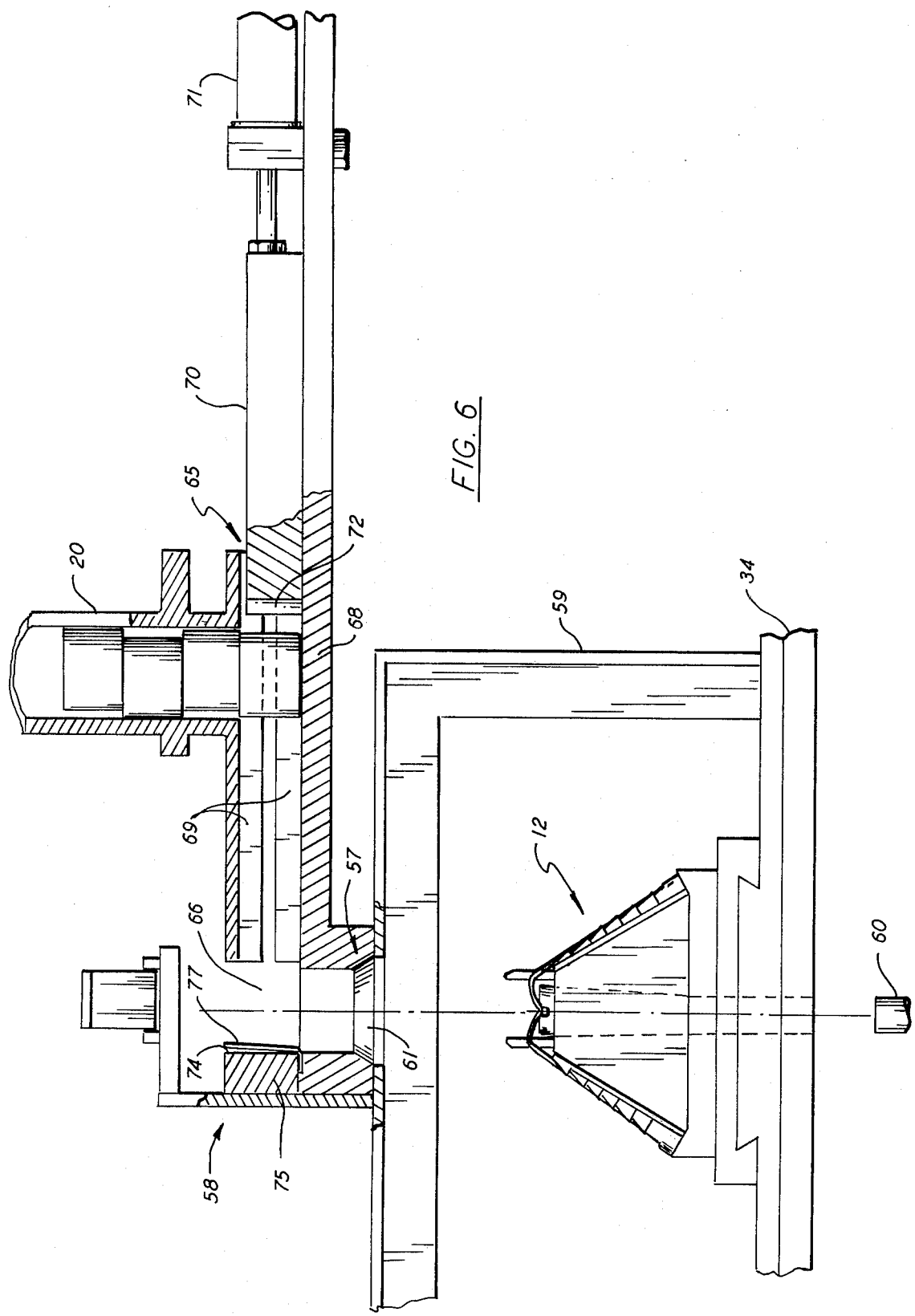
FIG. 6 is a front section taken along lines 6—6 in FIG. 5 showing the forming gauge and banding block mechanism utilized in the present invention.

The rod, as it continues its upward movement, transports the unit through the forming gauge and into the banding block 58 whereupon a resilient band 28 is placed over the assembled unit to hold it in the desired configuration. As best illustrated in FIG. 6, the banding block includes the previously noted feeding tube 20 leading from the vibratory bowl. A steady flow of bands is thus provided to a band handling mechanism 65 that is arranged to dispense the sleeves laterally into an opening 66 located directly above the exit to the forming gauge. Upon leaving the feed tube, each band falls upon a horizontal plate 68 having side margin guides 69—69 associated therewith for establishing a lateral passageway along which the bands can be directed into the opening. In operation, a slide 70 is driven laterally along the plate 68 by means of an air cylinder 71 in response to a time signal from the machine control system. The end face 72 of the slide is generally semicircular in form and is arranged to compliment the outside wall of the band so that the band will become well seated against the face as the slide is driven towards the opening 66.

Full extension of the slide brings the band into contact with the contoured surface 74 of a holding block 75. Surface 74 is also semi-circular in form and co-acts with surface 72 on the slide to support the band in a circular configuration directly over the forming gauge opening. A soft spring 77 is secured to the bottom wall of the block and extends upwardly in a vertical direction into the opening 66. The spring serves to apply a slight biasing pressure against the outside surface of the band to insure that the band is well seated in a cylindrical posture against the contoured surfaces forming the interior wall of the opening.

As the assembled unit passes out of the forming gauge, it is driven into the band. Because of the shape of the shell sections, the band is forced over the assembly and slipped down into holding contact therewith. The rod continues to a fully extended position wherein the assembled shell unit is moved clear of the banding mechanism. A spring-loaded kicker bar 80 is mounted upon a bracket 81 at the exits to the banding mechanism. The kicker bar is adapted to engage the unit as it is leaving the banding device and direct it into a chute or collecting bin.

It should be clear from the disclosure above that the forming gauge also functions as an inspection tool that prevents misaligned or oversize shell assemblies from passing therethrough. A defective unit is thus rejected before it can be packaged and shipped to a final destination. As can be seen, each unit produced in the machine of the present invention is thus individually and automatically inspected to insure its reliability when placed in operation.

While this invention has been described with reference to the details as set forth above, it is not limited to the specific structure as disclosed and the invention is intended to cover any modifications or changes as may come within the scope of the following claims.

We claim:

1. The method of assembling and banding together the component parts of an expansion shell including the steps of loading the components of the shell into a die that is positioned within a first work station wherein a pair of shell sections are inclined on either side of a tapered wedge and a U-shaped strap, whose legs are secured between raised ears depending from each shell section with the base of the strap passing over the wedge, moving the die to a second work station, coining the ears of the shell sections against the strap, returning the die to the first work station, ejecting the component parts situated upon the die through a forming gauge to bring the parts into a final configuration, and passing the configured parts into a resilient band to hold the parts in the final configuration.

2. The method of claim 1 which further includes the step of supporting the resilient band at the exit to the forming gauge whereby the configured parts pass into the band as they pass through the gauge.

3. The method of claim 1 wherein the coining step is carried out by advancing a staking tool incrementally into compressing contact with the ears of the shell sections.

4. The method of claim 1 wherein the wedge is ejected from the die by passing the wedge upwardly into moving contact with the base of the strap whereby the shell sections are pulled from the die.

5. The method of claim 1 further including the steps of seating the shell sections upon saddles contained in the die and containing the wedge within a central opening formed in the die.

6. The method of claim 5 wherein the shell components are ejected by moving an ejecting tool upwardly through the central opening of the die.

7. Apparatus for automatically assembling the component parts of an expansion shell including a die mounted upon a slide for reciprocal movement between a first and a second work station and being arranged to support the component parts of a shell in a predetermined alignment thereon, said die including a centrally located hole passing vertically therethrough for supporting and positioning a tapered wedge within the die, a pair of inclined saddles located on opposite sides of the central opening for supporting a pair of shell sections thereupon, and a guide means for locating a U-shaped strap in said die with the legs of the strap being received in raised ears raised upwardly from the shell sections and the base of the strap passing over the wedge, a staking tool located in the second station that is arranged to move vertically into deforming contact with the raised ears of the shells and coin the ears against the strap when the die is positioned in said second station, a forming gauge located in the first station having a contoured opening that is positioned over the hole in said die when said die is positioned in the first station, said contoured opening being arranged to conform the parts mounted in said die into a final configuration as the parts are passed therethrough, ejecting means also located in the first station that is arranged to pass upwardly through the hole in the die to project the wedge and the overlying strap through the forming die whereupon the shell sections staked to the strap are drawn into conforming relationship with the wedge as they are drawn through the die, and drive means for moving the die between stations.

8. The apparatus of claim 7 wherein the staking tool includes a pair of punches having working surfaces that parallel the plane of inclination of the die saddles whereby the ears of the shells are deformed incrementally as the punches pass vertically into the ears.

9. The apparatus of claim 7 which further includes a banding block positioned adjacent to the forming gauge in the first station for supporting a resilient band at the exit to the gauge opening in a condition so that the conformed shell leaving the gauge is passed into the band.

10. The apparatus of claim 9 wherein the ejection means includes a rod that is normally retracted below the die in the first station and a drive cylinder for extending the rod upwardly through the die, the forming gauge and the banding block.

11. The apparatus of claim 9 which further includes an automatic feeding means for delivering and positioning individual bands into the banding block.

* * * * *